(12) United States Patent
Fang et al.

(10) Patent No.: US 11,875,572 B2
(45) Date of Patent: Jan. 16, 2024

(54) SPACE RECOGNITION METHOD, ELECTRONIC DEVICE AND NON-TRANSITORY COMPUTER-READABLE STORAGE MEDIUM

(71) Applicant: ALi Corporation, Hsinchu (TW)

(72) Inventors: Yu-Wei Fang, Hsinchu (TW); Shui Shih Chen, Hsinchu (TW); Chia Jui Kuo, Hsinchu (TW)

(73) Assignee: ALi Corporation, Hsinchu (TW)

( * ) Notice: Subject to any disclaimer, the term of this patent is extended or adjusted under 35 U.S.C. 154(b) by 215 days.

(21) Appl. No.: 17/180,684

(22) Filed: Feb. 19, 2021

(65) Prior Publication Data
US 2021/0303847 A1    Sep. 30, 2021

Related U.S. Application Data

(60) Provisional application No. 62/994,288, filed on Mar. 25, 2020.

(51) Int. Cl.
*G06V 20/56*    (2022.01)
*G06T 7/70*    (2017.01)

(52) U.S. Cl.
CPC ............... *G06V 20/56* (2022.01); *G06T 7/70* (2017.01); *G06T 2207/10028* (2013.01)

(58) Field of Classification Search
CPC .. G06V 20/00; G06T 7/70; G06T 2207/10028
See application file for complete search history.

(56) References Cited

U.S. PATENT DOCUMENTS

| 2012/0197437 A1* | 8/2012 | Lee ..................... G05D 1/0255 |
| | | 901/1 |
| 2016/0061612 A1 | 3/2016 | You et al. |
| 2017/0138729 A1* | 5/2017 | Hung .................. G05D 1/0242 |
| 2019/0317507 A1* | 10/2019 | Zhang ................. G05D 1/0214 |
| 2020/0033109 A1* | 1/2020 | Sugita ................. G01B 11/005 |

FOREIGN PATENT DOCUMENTS

| CN | 108628318 | 10/2018 |
| CN | 109464074 | 3/2019 |
| CN | 109947109 | 6/2019 |
| CN | 110286669 | 9/2019 |
| JP | 2019145039 | 8/2019 |

OTHER PUBLICATIONS

"Notice of allowance of China Counterpart Application", dated Jun. 7, 2023, p. 1-p. 4.

* cited by examiner

*Primary Examiner* — Wednel Cadeau
(74) *Attorney, Agent, or Firm* — JCIPRNET (57) ABSTRACT

The embodiments of the disclosure provide a space recognition method, an electronic device and a non-transitory computer-readable storage medium. The method includes the following steps. Sensor data for detecting obstacle positions is obtained from a sensor associated with an electronic device. A plurality of coordinates respectively corresponding to the obstacle positions are generated based on the sensor data. Boundary line information of a space surrounding the electronic device is updated according to the coordinates until an optimization condition is met for each boundary line. A spatial range of the space surrounding the electronic device is identified based on the boundary line information. The spatial range is used to guide a movement of the electronic device.

16 Claims, 6 Drawing Sheets

SPACE RECOGNITION METHOD, ELECTRONIC DEVICE AND NON-TRANSITORY COMPUTER-READABLE STORAGE MEDIUM

CROSS-REFERENCE TO RELATED APPLICATION

This application claims the priority benefit of U.S. provisional application Ser. No. 62/994,288, filed on Mar. 25, 2020. The entirety of the above-mentioned patent application is hereby incorporated by reference herein and made a part of this specification.

BACKGROUND

Technical Field

The disclosure relates to an environment information recognition technology, and in particular, to a space recognition method, an electronic device and a non-transitory computer-readable storage medium.

Description of Related Art

With the advancement of technology, more and more smart moving devices are becoming more commonly used in the recent years, such as automatic sweeping robots, navigation robots, industrial robots, unmanned vehicle, etc. Depending on the different applications, these smart moving devices may move in the operating spaces by themselves without human assistance. These smart moving devices need the environment information of the operating spaces, such that the smart moving devices are able to move without human assistance to accomplish their tasks. The environment information had by the smart moving devices may directly affect not only the behavior decision of the smart moving devices but also the work efficiency of the smart moving devices. Generally, the smart moving devices may have a map of its operating space or spatial range of the operating spaces so as to move in the operating spaces by using such information. The map may include boundary information of the operating space, obstacle positions, movable range, etc. The map of the operating spaces may be informed by human interaction, previously stored in the smart moving devices, or built by the smart moving devices performing the prescribed and fixed movement behavior. However, the maps which usually have huge data amount finally need to be stored in the smart moving devices, and hence the demand for the memory for storing the map would be high. Besides, when the smart moving devices perform the prescribed and fixed movement behavior, such as the wall follower movement, to recognize the spatial range of the operating spaces, some fragmented areas having smaller area may be generated due to the limitation of the prescribed and fixed movement behavior. Existence of the fragmented areas may cause the work efficiency of the smart moving devices become worse.

SUMMARY

In view of this, the disclosure provides a space recognition method, an electronic device and a non-transitory computer-readable storage medium, which may recognize a complete spatial range of the space surrounding the electronic device without building the map.

One of the embodiments of the disclosure provides a space recognition method, which includes the following steps. Sensor data for detecting obstacle positions is obtained from a sensor associated with an electronic device. A plurality of coordinates respectively corresponding to the obstacle positions are generated based on the sensor data. Boundary line information of a space surrounding the electronic device is updated according to the coordinates until an optimization condition is met for each boundary line. A spatial range of the space surrounding the electronic device is identified based on the boundary line information. The spatial range is used to guide a movement of the electronic device.

One of the embodiments of the disclosure provides an electronic device, which includes one or more sensors, a memory and a processor. The one or more sensors are disposed on the electronic device and configured to obtain sensor data for detecting obstacle positions. The memory stores a set of instructions. A processor is communicatively coupled to the one or more sensors and the memory and is configured to execute the set of instructions to cause the electronic device to perform: obtaining the sensor data from the one or more sensors; generating a plurality of coordinates respectively corresponding to the obstacle positions based on the sensor data; updating boundary line information of a space surrounding the electronic device according to the coordinates until an optimization condition is met for each boundary line; identifying a spatial range of the space surrounding the electronic device based on the boundary line information; and using the spatial range to guide a movement of the electronic device.

One of the embodiments of the disclosure provides a non-transitory computer-readable storage medium, which stores a set of instructions that are executable by one or more processors of a device to cause the device to perform a space recognition method. The space recognition method includes the following steps. Sensor data for detecting obstacle positions is obtained from a sensor associated with an electronic device. A plurality of coordinates respectively corresponding to the obstacle positions are generated based on the sensor data. Boundary line information of a space surrounding the electronic device is updated according to the coordinates until an optimization condition is met for each boundary line. A spatial range of the space surrounding the electronic device is identified based on the boundary line information. The spatial range is used to guide a movement of the electronic device.

Based on the above, in the embodiments of the disclosure, when the electronic device moves to a current location, the electronic device may use the sensor data to obtain the coordinates corresponding to the obstacle positions, and the coordinates corresponding to the obstacle positions are used to determine boundary line information of a space surrounding the electronic device. Then, the boundary line information of the space surrounding the electronic device may be updated based on the sensed data. In response to that the optimization condition is met for each boundary line, the electronic device may stop optimizing the boundary line information. Such that, the spatial range for guiding the movement of the electronic device may be recognized according to the boundary line information without storing or building a map having huge data amount. Further, the probability of appearance of the fragmented areas may be apparently reduced, and the work efficiency of the electronic device is enhanced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Some embodiments of the disclosure will now be more fully described hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Figure 1:
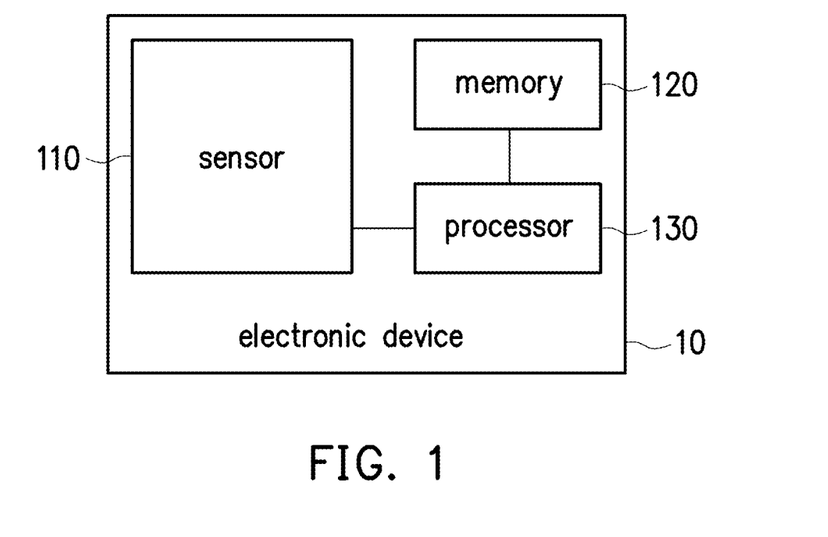
FIG. 1 is a block diagram illustrating an electronic device according to an embodiment of the disclosure.

FIG. 1 is a block diagram illustrating an electronic device according to an embodiment of the disclosure. All components of the electronic device and their configurations are first introduced in FIG. 1. The functionalities of the components are disclosed in more detail in conjunction with FIG. 2.

With reference to FIG. 1, an electronic device 10 includes one or more sensors 110, a memory 120 and a processor 130. In various embodiments, the electronic device 10 may be any self-propelled device which can move on the ground in an operating space without human interaction. For instance, the electronic device 10 may be an autonomous mobile robot, an unmanned ground vehicle, an automated guided vehicles or a robotic vacuum cleaner, or other similar movable electronic devices, but the disclosure is not limited thereto. In some embodiments, the electronic device 10 may make some behavior decision according to the environment information so as to accomplish its task.

The sensor 110 is disposed on the electronic device 10 and configured to obtain sensor data for detecting obstacle positions. The sensor 110 can sense the environment information of the space surrounding the electronic device by different sensing manners to provide the sensor data to the processor 130. In some embodiments, the sensor 110 may be, for example, a radar, a sound wave sensing device, or an optical radar using optical ranging, a depth-of-field camera, an image capturing device, etc., but the disclosure is not limited thereto. In some embodiments, the sensor 110 can detect distance information between the electronic device 10 and some obstacles in the space where the electronic device 10 is located at. For instance, the sensor 110 may be a LIDAR which is a 360-degree two-dimensional laser range scanner, and the sensor 110 can detect obstacle distances at a plurality of sensing angles. Alternatively, the sensor 110 may be a depth-of-field camera or any other image capturing device having at least two lens and at least two image sensors, and the sensor 110 can detect depth information with respect to a plurality of image feature points.

The memory 120 is configured to store data including images, programming codes, setting values, instructions or the like, and may be, for example, a stationary or mobile device in any form such as a random access memory (RAM), a read-only memory (ROM), a flash memory, a hard drive or other similar devices, integrated circuits or a combination of the above.

The processor 130 is communicatively coupled to the sensor 110 and the memory 120. The processor 130 may be, for example, a central processing unit (CPU), or other programmable devices for general purpose or special purpose such as a microprocessor, a digital signal processor (DSP), a programmable controller, an application specific integrated circuit (ASIC), a programmable logic device (PLD) or other similar devices or a combination of above-mentioned devices.

However, in addition to the sensor 110, the memory 120 and the processor 130, the electronic device 10 may also include components not shown in FIG. 1, such as an odometry, a display, a gyroscope, a power supply device, a motor, etc., the disclosure is not limited thereto.

In the embodiments of the disclosure, the processor 130 is configured to access and execute the modules, the set of instructions and/or the program codes stored in the memory 120 to implement the space recognition method provided in the disclosure, which would be further discussed in the following.

Figure 2:
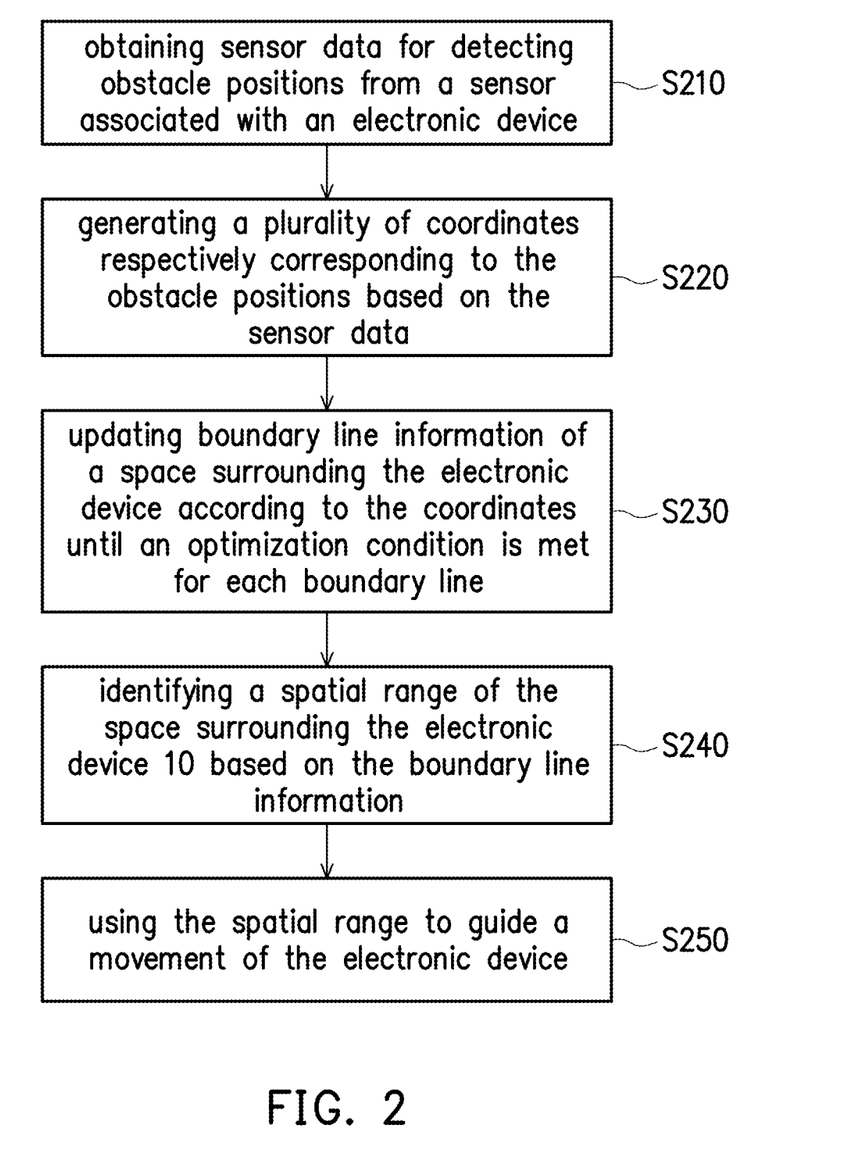
FIG. 2 is a flowchart illustrating a space recognition method according to an embodiment of the disclosure.

With reference to FIG. 2, FIG. 2 is a flowchart illustrating a space recognition method according to an embodiment of the disclosure. The method proposed by the present embodiment is adapted to the movable electronic device 10 depicted in FIG. 1, and the details of each step in FIG. 2 will be described below with the components shown in FIG. 1.

In step S210, the processor 130 may obtain sensor data for detecting obstacle positions from a sensor 110 associated with an electronic device 10. In some embodiments, the sensor data may include data reflective of a plurality of obstacle distances at a plurality of sensing angles. For instance, the sensing angles may be 1°, 2°, ..., 360°. However, the precision and the number of the sensing angles is not limited in the disclosure, which can be configured according to actual demand. In some embodiments, the sensor data may include depth information with respect to a plurality of image feature points. For instance, the sensor data may be a depth map generated by at least two images captured in different view angles. In some embodiments, the obstacle positions are the positions of the obstacles which are located in the same space with the electronic device 10. The obstacles may block the movement of electronic device 10, such as walls, furniture, etc. The distance information between the position of the electronic device 10 and obstacle positions can be detected by the sensor 10.

In step S220, the processor 130 may generate a plurality of coordinates respectively corresponding to the obstacle positions based on the sensor data. In detail, since the distance information between the position of the electronic device 10 and obstacle positions can be detected by the sensor 110, the processor 130 can determine the 2D coordinates respectively corresponding to the obstacle positions based on the position of the electronic device 10 and the sensor data provided by the sensor 110. Specifically, each 2D coordinate corresponding to one of the obstacle positions may include X-axis coordinate component and Y-axis coordinate component, and the coordinates respectively corresponding to the obstacle positions may be generated based on an origin point of a Cartesian coordinate system. It should be noted that, since the electronic device 10 moves to the different locations, the obstacle positions detected by the sensor 110 may be varied. Namely, in response to that the electronic device 10 moves to the different locations, the coordinates of the obstacle positions detected at the different locations may be varied.

In some embodiments, the processor 130 may calculate the plurality of coordinates respectively corresponding to the obstacle positions according to the obstacle distances at the sensing angles and a current location of the electronic device 10. In detail, the sensor 110 can provide the sensor data which is data reflective of a plurality of obstacle distances at a plurality of sensing angles. In some embodiments, the sensor 110 can emit the light beam respectively directed to the plurality of sensing angles, and the data reflective of the obstacle distances respectively at the sensing angles can be estimated according to the reflected light beams received by the sensor 110. Such that, the processor 130 can calculate the plurality of coordinates respectively corresponding to the obstacle positions according to the obstacle distances at the sensing angles and the current location of the electronic device 10.

In some embodiments, the processor 130 may calculate the plurality of coordinates respectively corresponding to the obstacle positions according to the depth information with respect to the image feature points and a current location of the electronic device 10. In detail, the sensor 110 can provide the sensor data which is depth information with respect to a plurality of image feature points. In some embodiments, the sensor 110 can capture the images by at least two view angles, and the depth information of the image feature points can be estimated by using a depth estimation algorithm. For example, the processor 120 can obtain the depth information and calculate the plurality of coordinates respectively corresponding to the obstacle positions by visual simultaneous location and mapping (v-SLAM) techniques. Such that, the processor 130 can calculate the plurality of coordinates respectively corresponding to the obstacle positions according to the depth information and the current location of the electronic device 10.

In step S230, the processor 130 may update boundary line information of a space surrounding the electronic device 10 according to the coordinates until an optimization condition is met for each boundary line. In detail, after the coordinates respectively corresponding to the obstacle positions is calculated while the electronic device 10 is at a current location, the processor 130 can update boundary line information of the space by using the coordinates associated with the current location. Herein, the boundary line information of the space may be updated by using a local extremum among coordinate components of the coordinates associated with the current location. In response to the optimization condition is met for each boundary line, the processor 130 may stop updating the boundary line information of the space. In response to the optimization condition is not met for each boundary line, the processor 130 may keep updating the boundary line information of the space.

In some embodiments, the processor 130 may keep collecting boundary line information of the space until the optimization condition is met for each boundary line, wherein the boundary line information of the space may include a plurality of possible positions of the boundary lines. For instance, the boundary line information collected at the two different locations can be expressed as Table I.

TABLE I

| Location of electronic device | Upper boundary line | Bottom boundary line | Right boundary line | Left boundary line |
|---|---|---|---|---|
| Previous location | $y_{max1}$ | $y_{min1}$ | $x_{max1}$ | $x_{min1}$ |
| Current location | $y_{max2}$ | $y_{min2}$ | $x_{max2}$ | $x_{min2}$ |

In some embodiments, the processor 130 may update the position of the boundary lines by comparing the temporary boundary line with the extremum among the coordinates respectively corresponding to the obstacle positions until the optimization condition is met for each boundary line. For instance, the four temporary boundary lines of the boundary line information can be expressed as $x=a1$, $x=a2$, $y=b1$, and $y=b2$ in the Cartesian coordinate system, wherein the $a1 \neq a2$ and $b1 \neq b2$. When the processor 130 obtains a coordinate corresponding to one obstacle position is $(a3, b3)$, the boundary line $x=a1$ can be updated as $x=a3$ if $a3$ is greater than $a1$ and $a1$ is greater than $a2$.

In step S240, the processor 130 may identify a spatial range of the space surrounding the electronic device 10 based on the boundary line information. Namely, after the optimization condition is met for each boundary line, the processor 130 can recognize the spatial range of the space according to the coordinate information of the boundary lines. In some embodiments, the processor 130 may identify a quadrilateral area based on the boundary line information as the spatial range.

In some embodiments, the processor 130 may obtain a first maximum value and a first minimum value of a first axis, i.e. X-axis, based on the boundary line information. The processor 130 may obtain a second maximum value and a second minimum value of a second axis, i.e. Y-axis, based on the boundary line information. For example, the processor 130 may obtain a first maximum value 'Amax' of the X-axis from the boundary line information including a plurality of possible positions of a right boundary line. The processor 130 may obtain a first minimum value 'Amin' of the X-axis from the boundary line information including a plurality of possible positions of a left boundary line. The processor 130 may obtain a second minimum value 'Bmin' of the Y-axis from the boundary line information including a plurality of possible positions of a bottom boundary line. The processor 130 may obtain a second maximum value 'Bmax' of the Y-axis from the boundary line information including a plurality of possible positions of an upper boundary line. Such that, the spatial range of the space can be identified based on the four boundary lines, which linear equations are $x=Amax$, $x=Amin$, $y=Bmax$, $y=Bmin$.

In some embodiments, the boundary line information may include a newest position of each boundary line. Therefore, after the optimization condition is met for each boundary line, the processor 130 may use the final position of each boundary line to identify the spatial range of the space.

In step S250, the processor 130 may use the spatial range to guide a movement of the electronic device 10. In some embodiments, the processor 130 determines a movement path of the electronic device 10 according to the spatial range. For instance, a cleaning path of a robotic vacuum cleaner may be determined according to the spatial range.

Figure 3:
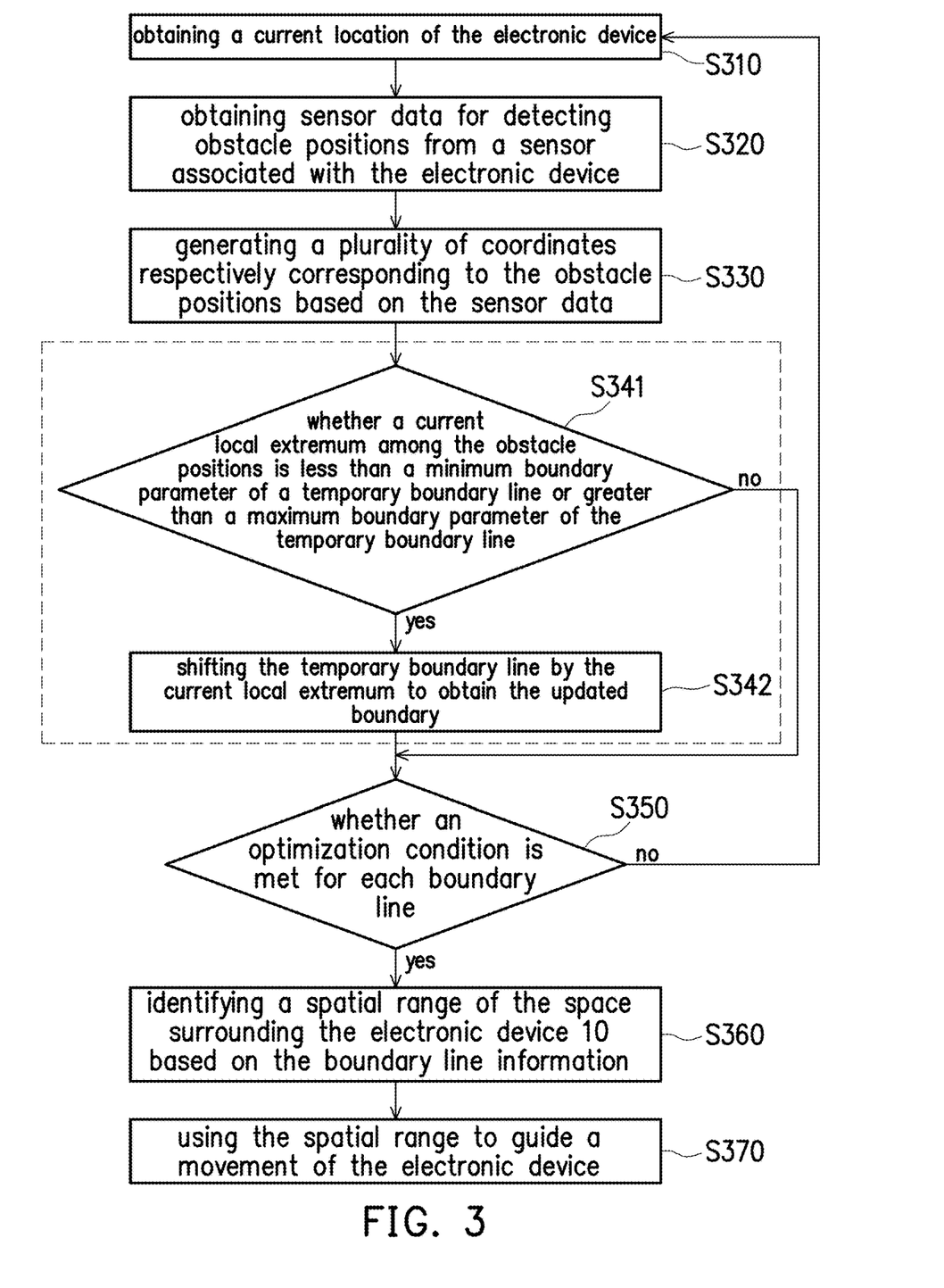
FIG. 3 is a flowchart illustrating a space recognition method according to an embodiment of the disclosure.

With reference to FIG. 3, FIG. 3 is a flowchart illustrating a space recognition method according to an embodiment of the disclosure. The method proposed by the present embodiment is adapted to the movable electronic device 10 depicted in FIG. 1, and the details of each step in FIG. 3 will be described below with the components shown in FIG. 1.

In step S310, the processor 130 may obtain a current location of the electronic device 10. In some embodiments, the processor 130 may obtain displacement data of the electronic device 10 by using an odometry, such that the displacement on the x-axis and the y-axis can be obtained. Then, the processor 130 may identify a current location of the electronic device 10 according to a reference position and the displacement data. The reference position may be an origin point of the coordinate system or the previous location of the electronic device 10. In other embodiments, the processor 130 can obtain a current location of the electronic device 10 by using other position manners, which is not limited in the disclosure.

In step S320, the processor 130 may obtain sensor data for detecting obstacle positions from a sensor 110 associated with the electronic device 10. In step S330, the processor 130 may generate a plurality of coordinates respectively corresponding to the obstacle positions based on the sensor data. The operation and the detail of the step S320 and the step S330 are similar with the operation and the detail of the step S210 and the step S220, which would not be described again.

In step S340, the processor 130 may update boundary line information of a space surrounding the electronic device 10 according to the coordinates until an optimization condition is met for each boundary line. In the present embodiment, the step S340 can be implemented as the step S341 to the step S342.

In step S341, the processor 130 may determine whether a current local extremum among the obstacle positions is less than a minimum boundary parameter of a temporary boundary line or greater than a maximum boundary parameter of the temporary boundary line. In detail, the electronic device may move from the previous location to the current location, the boundary line information is updated as the electronic device 10 is located at the current location. The temporary boundary line is determined as the electronic device 10 is located at the previous location. More Specifically to say, the processor 130 may obtain a plurality of coordinates respectively corresponding to the obstacle positions, and the processors may obtain the current local extremums in four axis directions (e.g. +x, −x, +y, −y directions) from the coordinates respectively corresponding to the obstacle positions. Then, the processor 130 may compare the current local extremums in four axis directions respectively with the positions of the temporary boundary lines.

If the step S341 is determined as 'yes', in step S342, the processor 130 may shift the temporary boundary line by the current local extremum to obtain the updated boundary line as the current local extremum is less than the minimum boundary parameter or greater than the maximum boundary parameter.

For instance, the four temporary boundary lines of the boundary line information can be expressed as x=a1, x=a2, y=b1, and y=b2 in the Cartesian coordinate system, wherein the a1≠a2 and b1≠b2. The processor 130 may obtain the current local extremums x=a3, x=a4, y=b3, and y=b4 in four axis directions from the coordinates respectively corresponding to the obstacle positions. If the processor 130 determines the current local extremum 'a3' is greater than a1 and a1 is greater than a2, the processor 130 may shift the temporary boundary line x=a1 toward the current local extremum 'a3' to obtain the updated boundary line x=a3. If the processor 130 determines the current local extremum 113' is less than b1 and b1 is less than b2, the processor 130 may shift the temporary boundary line y=b1 toward the current local extremum 113' to obtain the updated boundary line y=b3.

In other embodiments, as described in the above, the processor 130 may update boundary line information of a space surrounding the electronic device 10 by adding the current local extremums corresponding to the four axis directions to the boundary line information of the space.

In step S350, the processor 130 may determine whether an optimization condition is met for each boundary line or not. If the step S350 is determined as 'no', the processor 130 may control the electronic device 10 to move to the next location, and the step S310 to the step S340 may performed by the processor 130 repeatedly. In some embodiments, the electronic device 10 may move randomly. In some embodiments, if the optimization condition is met for one of the boundary lines, the electronic device 10 may be controlled by the processor 130 to move toward the other boundary lines. For instance, if the processor 130 stops updating the boundary information associated with the left boundary line, the processor 130 can control the electronic device 10 to move toward the right boundary line, the bottom boundary line or the upper bottom boundary line. Such that, in the present embodiments, the four boundary lines may be respectively shifted along with negative X-axis direction, positive X-axis direction, negative Y-axis direction, positive Y-axis direction, while the electronic device 10 continually keeps moving from one position to another position. That is, as the optimization condition is not met for each boundary line, the electronic device 10 may be controlled by the processor 130 to move to the next location, wherein the moving direction of the electronic device 10 is determined by the processor 130 according to the determining result of the step S350.

It should be noted that, in some embodiments, the optimization condition is met when a distance between a boundary line and a current location of the electronic device 10 is less than a distance threshold value. That is, if the electronic device 10 is close to a boundary line enough, the processor 130 may stop updating the boundary line information associated with the boundary line closed to the electronic device 10.

In some embodiments, the sensor data for detecting the obstacle positions comprises data reflective of an obstacle distance at a sensing angle. The optimization condition is met for each boundary line when the difference of obstacle distances with respect to two adjacent sensing angles is less than a boundary continuation threshold value. Specifically, the sensor 110, such as a LiDAR, can detect a plurality of obstacle distances respectively corresponding to the sensing angles. If all differences of the obstacle distances of any two adjacent sensing angles are less than a boundary continuation threshold value, the processor 130 may stop updating the boundary line information associated with the boundary line closed to the electronic device 10.

If the step S350 is determined as 'yes', in step S360, the processor 130 may identify a spatial range of the space surrounding the electronic device 10 based on the boundary line information. In the present embodiment, after the processor 130 stop updating the positions of the boundary lines, the processor 130 can identify a spatial range of the space according the final boundary lines. In step S370, the processor 130 may use the spatial range to guide a movement of the electronic device.

Figure 4A:
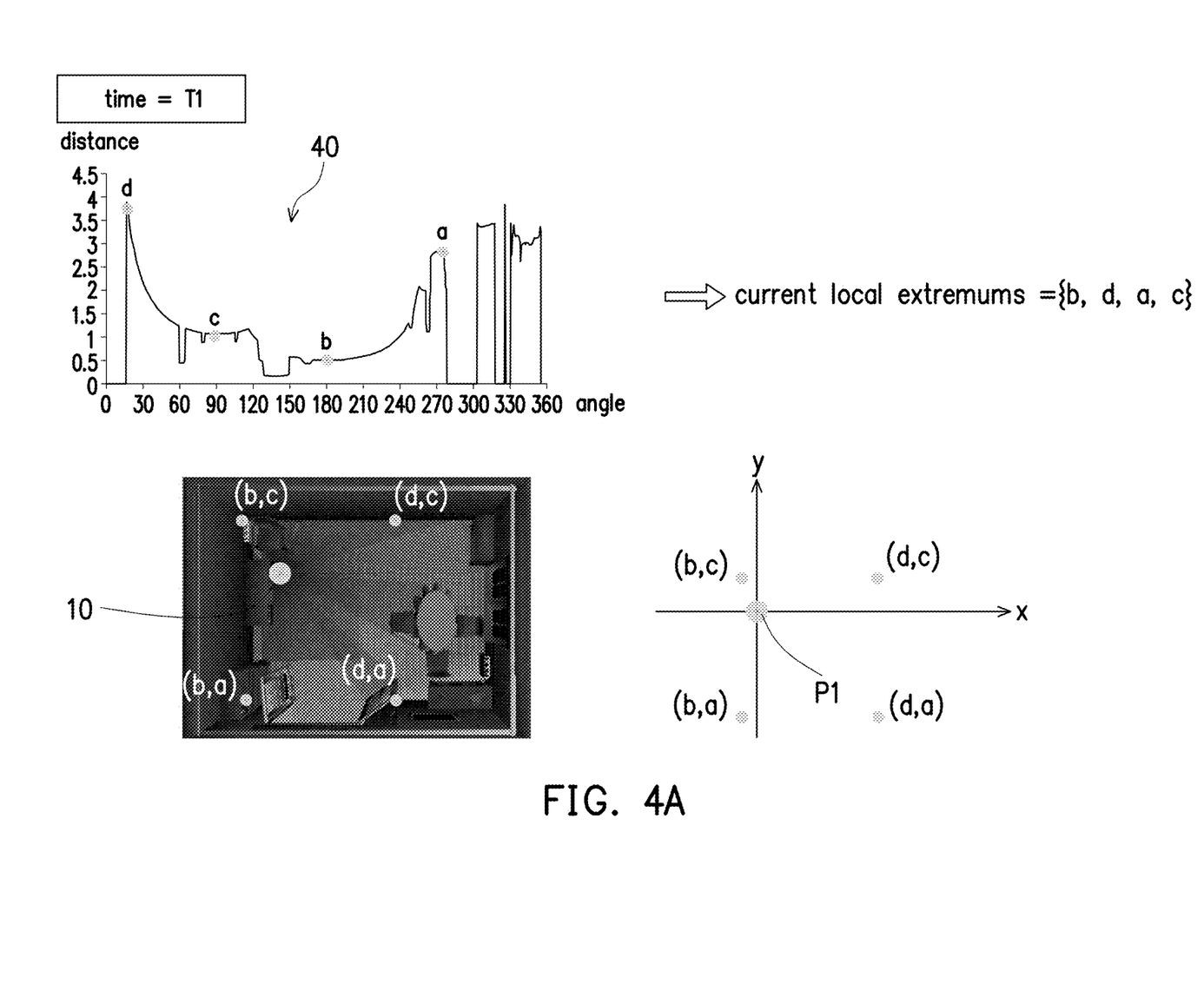
FIG. 4A to 4C illustrate schematic diagrams of optimizing the boundary line information to obtain the spatial range according to an embodiment of the disclosure.
Figure 4B:
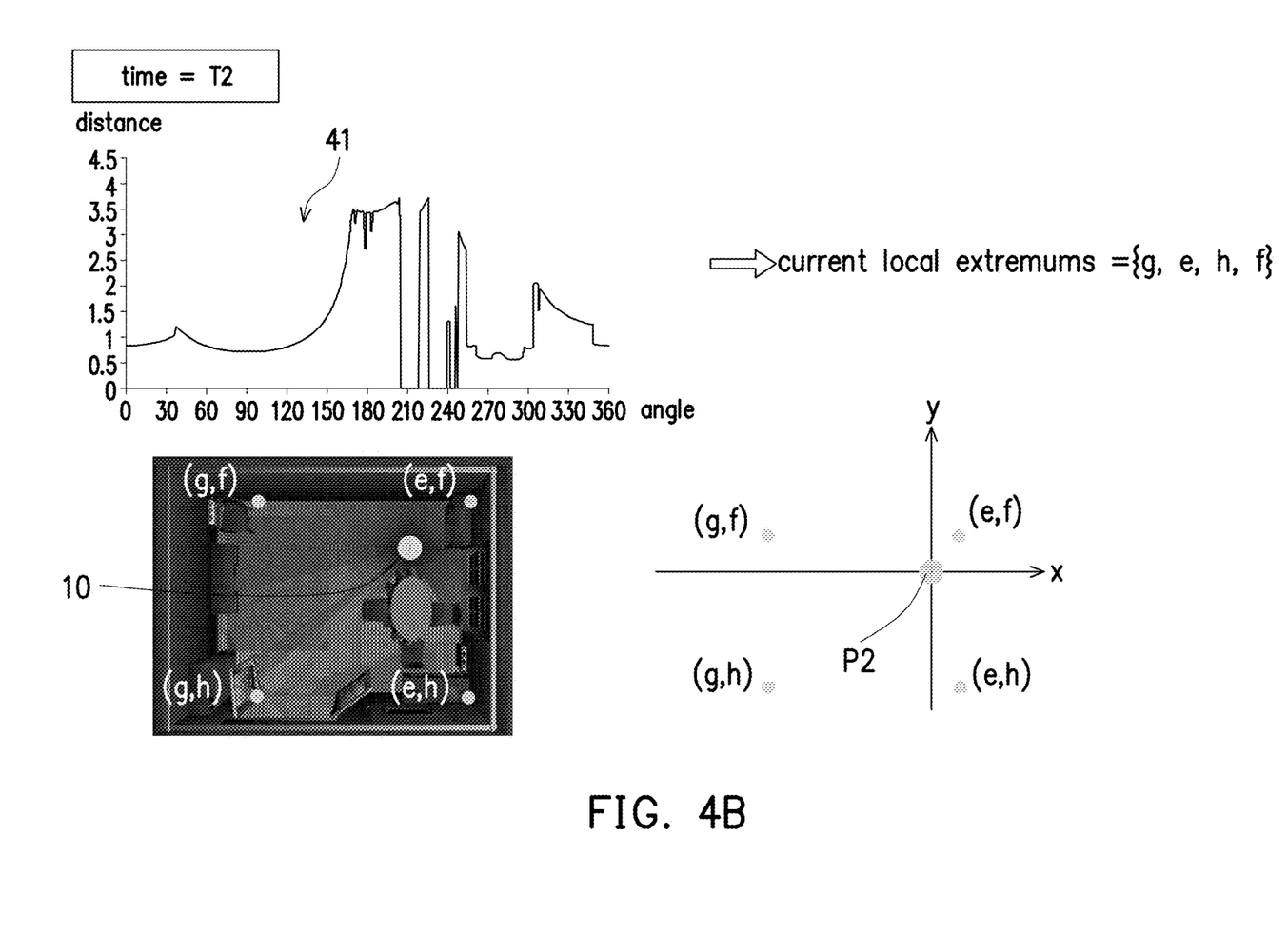
Figure 4C:
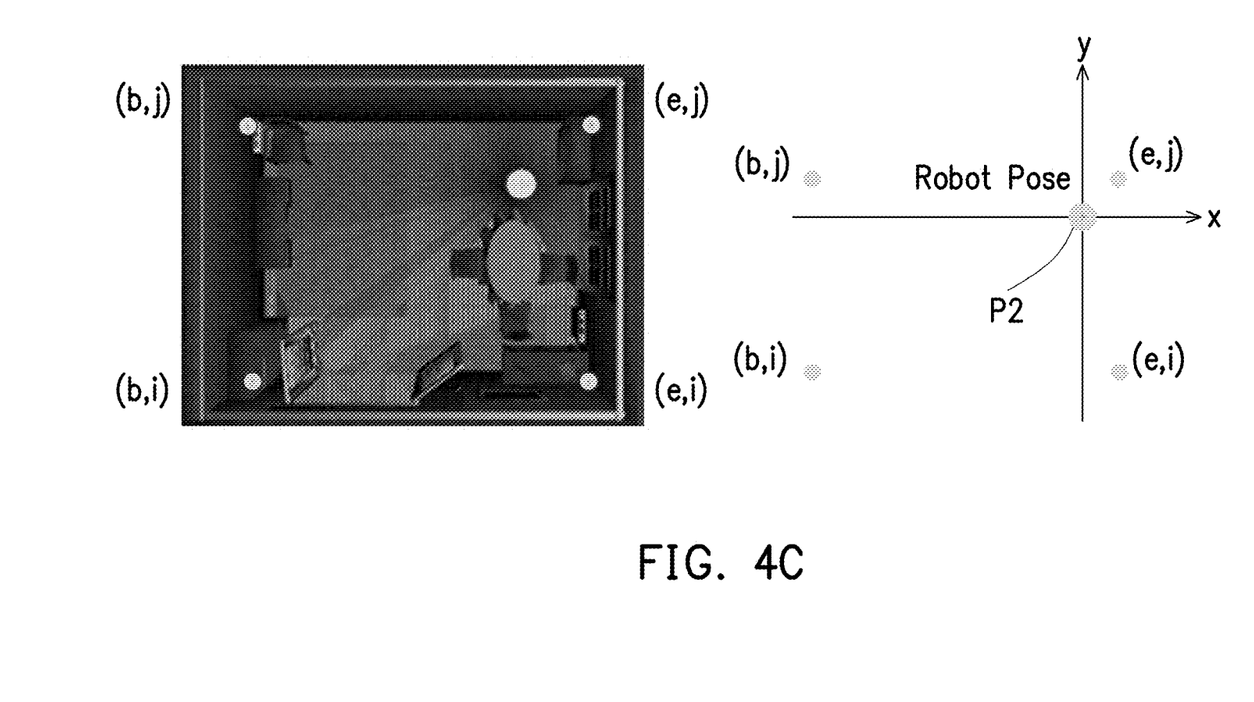

FIG. 4A to 4C illustrate schematic diagrams of optimizing the boundary line information to obtain the spatial range according to an embodiment of the disclosure. In FIG. 4A to 4C, the sensor 110 may be assumed to be a LiDAR, and the sensor data is data reflective of the obstacle distances at the sensing angles.

Please referring to FIG. 4A, at the time point T1, the electronic device 10 is located at the position P1. The processor 130 of the electronic device 10 can obtain sensor data 40 for detecting obstacle positions from the LiDAR. The sensor data 40 is data reflective of the obstacle distances at the sensing angles while the electronic device 10 is located at the position P1. The processor 130 can generating a plurality of coordinates respectively corresponding to the obstacle positions based on the sensor data 40, and each coordinate includes a X-axis coordinate component and a Y-axis coordinate component. Then, the processor 130 may obtain four current local extremums from the X-axis coordinate components and the Y-axis coordinate components of the coordinates respectively corresponding to the obstacle positions. The four current local extremums are two maximum values among the X-axis coordinate components and the Y-axis coordinate components and two minimum values among the X-axis coordinate components and the Y-axis coordinate components. In FIG. 4A, the current local extremums may be represented as {b, d, a, c}. The four boundary lines may be expressed as x=b, x=d, y=a and y=c. The boundary line information of the space can be represented as Table II.

TABLE II

| Location of electronic device | Upper boundary line | Bottom boundary line | Right boundary line | Left boundary line |
|---|---|---|---|---|
| P1 | c | a | d | b |

Please referring to FIG. 4B, assuming the optimization condition is not met for each boundary line. At the time point T2, the processor 130 may control the electronic device 10 move to the next location, which is the position P2. The sensor data 41 is data reflective of the obstacle distances at the sensing angles while the electronic device 10 is located at the position P2. The processor 130 can generating a plurality of coordinates respectively corresponding to the obstacle positions based on the sensor data 41, and each coordinate includes a X-axis coordinate component and a Y-axis coordinate component. Then, the processor 130 may obtain four current local extremums from the X-axis coordinate components and the Y-axis coordinate components of the coordinates respectively corresponding to the obstacle positions. In FIG. 4B, the current local extremums may be represented as {g, e, h, f}. The four boundary lines may be expressed as x=g, x=e, y=h and y=f. The boundary line information of the space can be updated and represented as Table III.

TABLE II

| Location of electronic device | Upper boundary line | Bottom boundary line | Right boundary line | Left boundary line |
|---|---|---|---|---|
| P1 | c | a | d | b |
| P2 | f | h | e | g |

Please referring to FIG. 4C, assuming the optimization condition has met for each boundary line. Then, the processor 130 can identify a spatial range of the space surrounding the electronic device 10 based on the boundary line information. In the present case, the processor 130 may obtain a maximum value of X-axis from the boundary line information {d, e}. The processor 130 may obtain a minimum value of X-axis from the boundary line information {b, g}. The processor 130 may obtain a minimum value of Y-axis from the boundary line information {a, h}. The processor 130 may obtain a maximum value of Y-axis from the boundary line information {c, f}. Assuming a=h=i, c=f=j, b<g and e>d, the spatial range of the space may be identified as a quadrilateral area having the four corner points (b, j), (e,j), (b,i) and (e, i).

The disclosure further provides a non-transitory computer-readable recording medium. This computer-readable recording medium can store a plurality of program code segments (e.g., creating an organization diagram program section, approving a list program section, setting a program section, and deploying a program section). The steps in the space recognition method above may be completed after these program code segments are loaded and executed by the processor 130 of the electronic device 10.

In view of the aforementioned descriptions, by using the sensor data, the electronic device can recognize a spatial range of the operating space where the electronic device is located at without building the map of the operating space. Therefore, the electronic device doesn't need the memory space for recording the map having huge data amount. Besides, the electronic device doesn't need to perform any prescribed and fixed movement behavior to recognize the spatial range of the operating space, such that the probability of appearance of the fragmented areas may be apparently reduced. Therefore, the efficiency for recognizing the spatial range of the operating space or performing the other task base on the spatial range can be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A space recognition method comprising:
obtaining sensor data for detecting obstacle positions from a sensor associated with an electronic device, wherein the electronic device is a self-propelled electronic device;
generating a plurality of coordinates respectively corresponding to the obstacle positions based on the sensor data;
updating boundary line information of a plurality of boundary lines of a space surrounding the electronic device according to the coordinates and determining whether an optimization condition is met for each of the boundary lines until the optimization condition is met for each boundary line, wherein the boundary line information comprises linear equations of the boundary lines;
in response to the optimization condition is met for each of the boundary lines, stop updating the boundary line information and identifying a quadrilateral area as a spatial range of the space surrounding the electronic device based on the linear equations of the boundary lines; and
using the spatial range to guide a movement of the electronic device, wherein the optimization condition is met when a distance between a boundary line and a current location of the electronic device is less than a distance threshold value, wherein the electronic device moves from a first position to a second position, and the coordinates comprises a plurality of first coordinates corresponding to the first position and a plurality of second coordinates corresponding to the second position, wherein the step of updating the boundary line information of the boundary lines of the space surrounding the electronic device according to the coordinates comprises:

generating a plurality of first boundary lines surrounding the first position according to the first coordinates and generating a plurality of second boundary lines surrounding the second position according to the second coordinates; and comparing the first boundary lines surrounding the first position and the second boundary lines surrounding the second position to update boundary line information of the space surrounding the electronic device according to the coordinates.

2. The space recognition method according to claim 1, wherein the sensor data for detecting the obstacle positions comprises data reflective of an obstacle distance at a sensing angle, and wherein the optimization condition is met for each boundary line when the difference of obstacle distances with respect to two adjacent sensing angles is less than a boundary continuation threshold value.

3. The space recognition method according to claim 1, further comprising:

obtaining displacement data of the electronic device; and identifying a current location of the electronic device according to a reference position and the displacement data.

4. The space recognition method according to claim 1, wherein the updating the boundary line information comprises:

determining whether a current local extremum among the obstacle positions is less than a minimum boundary parameter of a temporary boundary line or greater than a maximum boundary parameter of the temporary boundary line; and shifting the temporary boundary line by the current local extremum to obtain the updated boundary line as the current local extremum is less than the minimum boundary parameter or greater than the maximum boundary parameter, wherein the electronic device moves from a previous location to a current location, the boundary line information is updated while the electronic device is located at the current location, and the temporary boundary line is determined while the electronic device is located at the previous location.

5. The space recognition method according to claim 1, wherein the sensor data comprises data reflective of a plurality of obstacle distances at a plurality of sensing angles, and the generating the plurality of coordinates comprises:

calculating the plurality of coordinates respectively corresponding to the obstacle positions according to the obstacle distances at the sensing angles and a current location of the electronic device.

6. The space recognition method according to claim 1, wherein the sensor data comprises depth information with respect to a plurality of image feature points, and the generating the plurality of coordinates comprises:

calculating the plurality of coordinates respectively corresponding to the obstacle positions according to the depth information with respect to the image feature points and a current location of the electronic device.

7. The space recognition method according to claim 3, wherein the identifying the spatial range comprises:

obtaining a first maximum value and a first minimum value of a first axis based on the boundary line information; and obtaining a second maximum value and a second minimum value of a second axis based on the boundary line information.

8. An electronic device, comprising:

one or more sensors disposed on the electronic device and configured to obtain sensor data for detecting obstacle positions;

a memory storing a set of instructions;

a processor communicatively coupled to the one or more sensors and the memory and configured to execute the set of instructions to cause the electronic device to perform;

obtaining the sensor data from the one or more sensors, wherein the electronic device is a self-propelled electronic device;

generating a plurality of coordinates respectively corresponding to the obstacle positions based on the sensor data;

updating boundary line information of a plurality of boundary lines of a space surrounding the electronic device according to the coordinates and determining whether an optimization condition is met for each of the boundary lines until the optimization condition is met for each boundary line, wherein the boundary line information comprises linear equations of the boundary lines;

in response to the optimization condition is met for each of the boundary lines, stop updating the boundary line information and identifying a quadrilateral area as a spatial range of the space surrounding the electronic device based on the linear equations of the boundary lines; and using the spatial range to guide a movement of the electronic device, wherein the optimization condition is met when a distance between a boundary line and a current location of the electronic device is less than a distance threshold value, wherein the electronic device moves from a first position to a second position, and the coordinates comprises a plurality of first coordinates corresponding to the first position and a plurality of second coordinates corresponding to the second position, wherein the processor is configured to execute the set of instructions to cause the electronic device to further perform;

generating a plurality of first boundary lines surrounding the first position according to the first coordinates and generating a plurality of second boundary lines surrounding the second position according to the second coordinates; and comparing the first boundary lines surrounding the first position and the second boundary lines surrounding the second position to update boundary line information of the space surrounding the electronic device according to the coordinates.

9. The electronic device according to claim 8, wherein the sensor data for detecting the obstacle positions comprises data reflective of an obstacle distance at a sensing angle, and wherein the optimization condition is met when the difference of obstacle distances with respect to two adjacent sensing angles is less than a boundary continuation threshold value.

10. The electronic device according to claim 8, further comprising a position device communicatively coupled to the processor and configured to obtain displacement data of the electronic device, wherein the processor is further configured to execute the set of instructions to cause the electronic device to:
obtain the displacement data from the position device; and
identify a current location of the electronic device according to a reference position and the displacement data.

11. The electronic device according to claim 8, wherein the processor is further configured to execute the set of instructions to update the boundary line information by:
determining whether a current local extremum among the obstacle positions is less than a minimum boundary parameter of a temporary boundary line or greater than a maximum boundary parameter of the temporary boundary line; and
shifting the temporary boundary line by the current local extremum to obtain the updated boundary line as the local extremum is less than the minimum boundary parameter or greater than the maximum boundary parameter,
wherein the electronic device moves from a previous location to a current location, the boundary line information is updated while the electronic device is located at the current location, and the temporary boundary line is determined while the electronic device is located at the previous location.

12. The electronic device according to claim 8, wherein the processor is configured to execute the set of instructions to identify the spatial range by:
obtaining a first maximum value and a first minimum value of a first axis based on the boundary line information; and
obtaining a second maximum value and a second minimum value of a second axis based on the boundary line information.

13. The electronic device according to claim 8, wherein the sensor data comprises data reflective of a plurality of obstacle distances at a plurality of sensing angles, and the processor is configured to execute the set of instructions to generate the plurality of coordinates by:
calculating the plurality of coordinates respectively corresponding to the obstacle positions according to the obstacle distances at the sensing angles and a current location of the electronic device.

14. The electronic device according to claim 8, wherein the sensor data comprises depth information with respect to a plurality of image feature points, and the processor is configured to execute the set of instructions to generate the plurality of coordinates by:
calculating the plurality of coordinates respectively corresponding to the obstacle positions according to the depth information with respect to the image feature points and a current location of the electronic device.

15. A non-transitory computer-readable storage medium storing a set of instructions that are executable by one or more processors of a device to cause the device to perform a space recognition method, the space recognition method comprising:
obtaining sensor data for detecting obstacle positions from a sensor associated with an electronic device, wherein the electronic device is a self-propelled electronic device;
generating a plurality of coordinates respectively corresponding to the obstacle positions based on the sensor data;
updating boundary line information of a plurality of boundary lines of a space surrounding the electronic device and determining whether an optimization condition is met for each of the boundary lines until the optimization condition is met for each boundary line, wherein the boundary line information comprises linear equations of the boundary lines;
in response to the optimization condition is met for each of the boundary lines, stop updating the boundary line information and identifying a quadrilateral area as a spatial range of the space surrounding the electronic device based on the linear equations of the boundary lines; and
using the spatial range to guide a movement of the electronic device,
wherein the optimization condition is met when a distance between a boundary line and a current location of the electronic device is less than a distance threshold value,
wherein the electronic device moves from a first position to a second position, and the coordinates comprises a plurality of first coordinates corresponding to the first position and a plurality of second coordinates corresponding to the second position,
wherein the step of updating the boundary line information of the boundary lines of the space surrounding the electronic device according to the coordinates comprises:
generating a plurality of first boundary lines surrounding the first position according to the first coordinates and generating a plurality of second boundary lines surrounding the second position according to the second coordinates; and
comparing the first boundary lines surrounding the first position and the second boundary lines surrounding the second position to update boundary line information of the space surrounding the electronic device according to the coordinates.

16. The non-transitory computer-readable storage medium of claim 15, wherein the sensor data comprises data reflective of an obstacle distance at a sensing angle, and the optimization condition is met when the difference of obstacle distances with respect to two adjacent sensing angles is less than a boundary continuation threshold value.

* * * * *